United States Patent

[11] 3,587,128

[72] Inventors Salvatore Gualtieri
Massapequa;
Richard Marcucci, Brooklyn; Romolo
Marcucci, New York, N.Y.
[21] Appl. No. 670,272
[22] Filed Sept. 25, 1967
[45] Patented June 28, 1971

[54] MONOCRYSTALLINE SCRAPING APPARATUS AND ARTICLE FOR CLEANING MAGNETIC TAPE
9 Claims, 5 Drawing Figs.

[52] U.S. Cl. ........ 15/236, 15/93, 15/308
[51] Int. Cl. ........ B08b 1/02
[50] Field of Search ........ 15/308, 306, 93, 236, 100; 134/9; 83/651; 125/36—39; 76/(Diamond Tool Dig.), (Inquired); 51/309

[56] References Cited

UNITED STATES PATENTS

| | | | |
|---|---|---|---|
| 2,860,623 | 11/1958 | Muench | 125/39 |
| 2,256,847 | 9/1941 | Osenberg | 15/236UX |
| 3,195,164 | 7/1965 | Gysling | 15/308 |
| 3,370,982 | 2/1968 | Hayunga | 15/308 |

FOREIGN PATENTS

| | | | |
|---|---|---|---|
| 519,256 | 12/1955 | Canada | 125/39 |

OTHER REFERENCES

" Machinery" British, R. Stanley Smith - " Engineering Applications of Synthetic Sapphires, Rubies and Spinels" p. 208, 209, Aug. 21, 1947.

*Primary Examiner*—Walter A. Scheel
*Assistant Examiner*—Leon G. Machlin
*Attorney*—Darby and Darby

ABSTRACT: A magnetic tape cleaning device including a knife of monocrystalline material past which the magnetic tape is moved in contact to smooth the coating of magnetizable material. The knife also has a burnishing facet to further smooth the tape surface.

FIG. 1
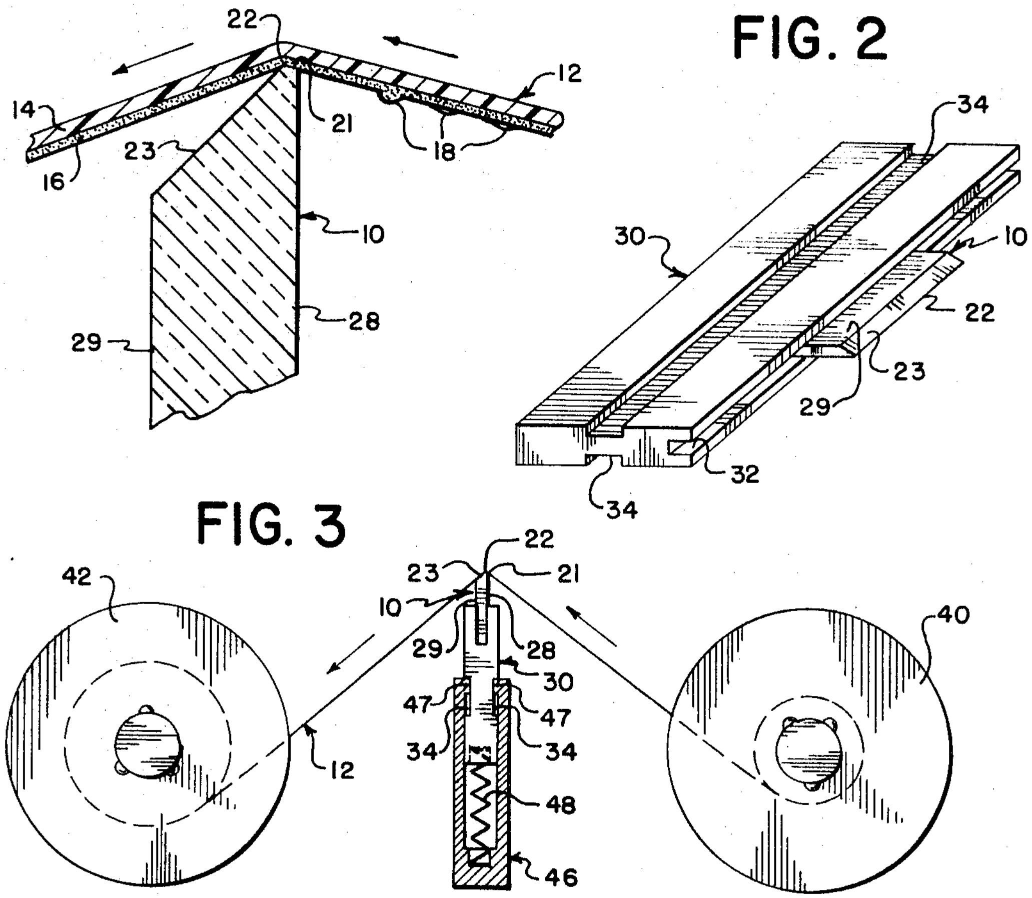
FIG. 2, FIG. 3
FIG. 5
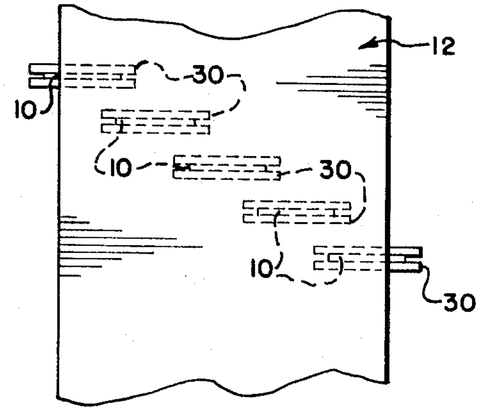
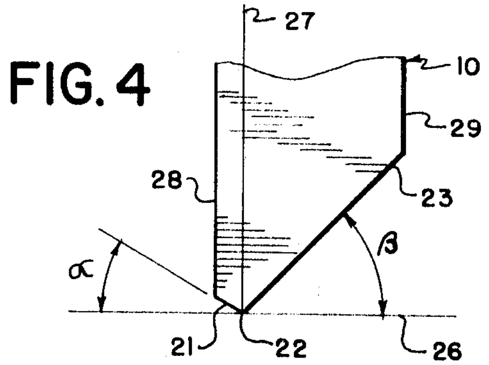
FIG. 4
INVENTORS
SALVATORE GUALTIERI
RICHARD MARCUCCI
ROMOLO MARCUCCI
BY Darby & Darby
ATTORNEYS

MONOCRYSTALLINE SCRAPING APPARATUS AND ARTICLE FOR CLEANING MAGNETIC TAPE

The manufacture of magnetic tape is a very tedious and exacting process. It begins with the growing of magnetic oxide crystals to exacting specifications. These magnetic oxide crystals are then prepared and mixed with a plastic vehicle to form a coating material having a consistency of approximately that of house paint. This coating material is then applied by an intricate coating process to a sheet of base material, usually an acetate or Mylar polyester film, approximately 0.001 thick. This coated plastic sheet is then sheared or cut to the desired width according to the demands of the computer and tape recorder manufacturers.

In computer application of magnetic tape, bits of information are recorded at a very high density, often in the order of 500 bits to the inch or more. Computer users are constantly demanding that more and more information be stored on the same tape surface. In addition, in many computer applications the write and read heads of the computer are often stacked in a row or rows, across the full length of the tape.

It should be apparent that because of this high density packing of information that the recording surface of the magnetic tape be kept as uniform as possible and that it be free of impurities and high spots, or pips. The reason for the latter is that the occurrence of high spots causes the tape to separate from the read head or heads of the other portions of the tape adjacent the high spot thereby reducing the amplitude of the voltage pulses produced from the readout information. This unwanted condition is called a signal dropout. Also, high spots cause interference pulses to be produced when a magnetized portion of the tape is moved rapidly away from the head, that is, the air gap between the head and the tape is rapidly changed. Therefore, it should be apparent that it is desirable to keep the coating of the tape as smooth as possible to provide a uniform surface throughout the entire length and width of the tape so that the information may be accurately recorded thereon and read therefrom.

Several different cleaning methods and apparatus have been proposed for cleaning magnetic tape. One such apparatus is shown in U.S. Pat. No. 3,035,295 to Buslik in which a metal scraper, similar to a vegetable shredder, is utilized. Such metal scrapers, as well as other kinds of metal implements such as razor blades, are not satisfactory for cleaning magnetic tape since they leave deposits of metal particles. These particles are deposited on the tape after the metal implement breakdown. These metal particles produce problems during readout and are also subject to a chemical reaction with the coating material. The breakdown of the metal is enhanced by the high heat factor generated due to the friction between the moving tape and the metal implement. This breakdown is particularly prevalent with steel, which is softer than many of the oxide coatings. Where metal knives, such as ordinary razor blades of steel or even blades of a sintered material such as tungsten, are used, the blades eventually are worn and have uneven edges. This gives rise to the possibility of the tape being split or having scratches and grooves produced therein.

Another disadvantage with blades of sintered material is that they cannot be polished to a keen edge and will not take steep clearance angles. Therefore it is impossible to get a good cutting edge and, as pointed out above, the uneven edges scratches the tape.

According to the present invention a novel apparatus for cleaning magnetic tapes is provided. The invention includes an elongated knife blade of monocrystalline material, such as sapphire or ruby which is harder than the oxide costing of the tape and over which the tape is passed to be smoothed and cleaned by removing the high spots. The blade is formed with a sharp cutting edge of a desired clearance angle and preferably it is also provided with a burnishing facet to further smooth the tape as it is being cleaned. It has been found that the use of such hard, monocrystalline materials is particularly advantageous since they will not react with the oxide. Also blades of these materials can be formed with a keen, even, cutting edge which will stay sharp for a relatively long period of time. In addition, the monocrystalline material can be processed quite readily to have a desired cutting clearance angle and shape of burnishing facet.

It is therefore an object of the present invention to provide a novel tape cleaning apparatus.

A further object is to provide a tape cleaning apparatus and method using a knife of a hard, monocrystalline material such as sapphire or ruby.

An additional object is to provide an apparatus for cleaning magnetic tape in which a sapphire or ruby knife having a burnishing facet is utilized and the tape is passed thereover, so that the high spots are scraped off.

Other objects and advantages of the present invention will become more apparent upon reference to the following specification and annexed drawing, in which:

FIG. 1 shows an elevational view in cross section of the knife of the present invention and a piece of magnetic tape;

FIG. 2 is a perspective view of the knife of the present invention mounted in a holder;

FIG. 3 is an elevational view partially in section, showing the processing of a roll of magnetic tape;

FIG. 4 is an elevational view of the blade illustrating the blade angles; and

FIG. 5 is a top view of an apparatus for processing wide webs of tape.

Referring to FIG. 1, a portion of a typical blade 10 made according to the subject invention is shown being used to clean a piece of magnetic tape 12. The tape is of conventional construction and has a base 14 which is of any suitable material, for example Mylar or other plastic, and a coating 16 of iron oxide particles or any other suitable metal capable of being magnetized. The particular type of tape with which the present invention may be utilized is of no importance and it can be made by any of the numerous conventional manufacturing techniques. As shown, the coating 16 of the tape has a number of high spots, or pips, 18. These pips 18 may be of any size and shape and they occur for any number of reasons, for example, due to improper mixture of the particle coating during the manufacturing process or improper coating of the material onto the tape base.

As shown in FIG. 1, the knife 10 has a cutting surface or edge 21 which terminates in a point or edge 22, forming a burnishing facet, with a rear face 23. The front and rear walls of the blade are shown at 28 and 29. As seen best in FIG. 2 the blade 10 is generally rectangular in shape and can be of any desired length within the limits imposed by the material forming the blade. Typical lengths which have been used are in the order of one-eighth to 2½ inch, depending upon the width of the magnetic tape which is to be processed.

It has been found that the most satisfactory materials for the blade 10 are of the monocrystalline type, such as ruby or sapphire. While natural ruby and sapphire (commonly called corundum) are satisfactory, they are considerably more expensive than the synthetic versions of the materials which, therefore, are preferable. One such type of synthetic sapphire material is sold in red, green and yellow colors. Ruby and sapphire materials, whether natural or synthetic, have been found to be particularly suitable since they are single crystals (monocrystalline) which are chemically inert. The former property permits the tape to be processed uniformly across its width, since the blade will have the same characteristics throughout. The latter property prevents any reaction with the oxide coating. These materials are also harder than the typical oxide coatings, such as iron oxide, and can take a cutting edge and hold it for a longer period of time. On the conventional Mohs Scale of Hardness these materials have a rating of 9. Other monocrystalline materials are not particularly suitable for use in the subject invention. For example, quartz (Mohs scale rating of 7) is too soft, as is glass. Using glass, for example, while an edge can be placed on it the edge will not last. The same holds true with quartz. It has been found that when using sapphire as the blade material, such blades have processed more than fifty 1800 foot reels of tape while still maintaining a sharp, uniform, cutting edge.

FIG. 2 shows the blade 10 mounted within a holder 30. The holder 30 may be made of any suitable material, such as aluminum. As shown, the holder has a channel 32 in which the blade is held by any conventional means such as setscrews or a suitable adhesive (not shown). The blade also may be pressed within the walls forming the channel 32. The holder 30 is of generally rectangular shape and also includes a pair of second channels 34 on opposite sides of the holder which permits the holder to be mounted in a suitable fixture adjacent the tape to be processed. The holder 30 is preferably made wider than the blade to give the blade good stability.

FIG. 3 shows the tape as it is being processed. The processing system includes a supply reel 40 holding a predetermined length of tape. A takeup reel 42 is also provided and the takeup reel is driven by any suitable device such as a motor (not shown). Normally, the supply reel 40 is braked by any suitable device, such as a brake or clutch, to maintain tension in the tape. As shown in FIG. 3 the holder 30 with the blade 10 is mounted in a fixture 46 with the holder being biased upwardly by a spring 48 mounted within the fixture. A pair of arms 47 of the fixture 46 fit into the two channels 34 of the holder to hold the holder 30 stable and prevent it from wobbling. If desired, the reverse arrangement can be used with the tape backing passing over a suitable surface, such as a felt pad, and the fixture 46 mounted so that the knife 10 is downwardly disposed to engage the tape recording surface.

In operation, the tape 12 is wound on the takeup reel 42 in the direction shown by the arrows of FIG. 3 with the coating 14 passing over the knife blade 10 which is as wide as, or wider than, the tape. This is shown in greater detail in FIG. 1. The coating 14 encounters the cutting surface 21 of the knife blade first and the pips 18 are removed. The tape then encounters the burnishing facet 22 and its rear face 23 which serves to polish the tape to a smoother surface than would normally be obtained by just the cutting surface 21 itself. An air stream may be played across the tape to remove the coating particles which are cut off.

It should be understood that a wide range of angles may be utilized for the clearance angle of the cutting surface 21. As shown in FIG. 4, the clearance angle $\alpha$ is measured between the edge of surface 21 and a line 27 parallel to the front wall 28 of the blade. The angle $\alpha$ is measured between the cutting surface 21 and a reference surface 26 which is perpendicular to the line 27. An angle $\beta$, for burnishing facet 22, is measured between the perpendicular line 27 and the burnishing face 23 of the blade.

It has been found that the angle $\alpha$ should be held within the range from about 5° to about 20° while the angle $\beta$ should be held in the range from about 5° to about 60°. In general the angle clearance $\alpha$ is varied for different oxide coating formulas. For a softer coating a steeper angle is needed while for harder coatings the clearance angle may be decreased. The angle $\beta$ is selected depending upon the burnishing action required with less steep angles providing greater burnishing.

In addition to the range of angles $\alpha$ and $\beta$ given above, the following are typical dimensions for a blade made in accordance with the subject invention:

1. length of blade–one-eighth to 2¼ inches
2. total height of blade–five thirty-seconds inch
3. height projecting beyond holder–one-fourth inch
4. thickness of blade–one-fourth inch
5. width of cutting surface 21–up to 0.0005 inches.

In addition the holder 30 may have a height of five-eighth inch and a length of one-fourth to 2½ inches, that is from one-eighth to one-fourth inches longer than the blade.

FIG. 5 shows an arrangement using the knife blades of the present invention for cleaning wide tapes. As shown, a number of holders 30, each holder having a blade 10 mounted therein, are staggered with respect to a magnetic tape 12 with the blades 10 overlapping. The reason for this arrangement is that it is necessary to provide a plurality of blades when a wide tape is being cleaned since it is difficult to form a sapphire or ruby blade larger than about 2¼ inches long. The reason for this is that crystals of longer than 2¼ inches are hard to grow. In general when a magnetic tape is processed, the webs are of a substantial width, for example, in the order of 28 inches. The webs are then split into the required width anywhere from one-fourth inch to 2¼ inches. As shown a number of the holders 30 are staggered side by side so that an entire wide web of tape may be cleaned in a single pass thereby eliminating the necessity for a number of passes to clean the web.

While the apparatus of the subject invention have particular utility for use with computer tapes, they also find use with tapes used for general audio purposes where good frequency response is desired.

While preferred embodiments of the invention have been described above it will be understood that these embodiments are illustrative only and the invention is to be limited solely by the appended claims.

We claim:

1. An article comprising a piece of monocrystalline material having a Mohs hardness of 8 or greater, said monocrystalline material formed as an elongated member and having a holding surface and formed with a cutting surface along the length of the member having a cutting edge for processing magnetic tape by scraping the surface of the tape having magnetizable material thereon as the tape is passed over said cutting edge, a burnishing facet also being formed directly on said member adjacent the said cutting surface.

2. The article of claim 1 wherein said monocrystalline material is selected from the group consisting of ruby and sapphire.

3. The article of claim 2 wherein the clearance angle of the cutting surface is in the range from between about 5° to 20°.

4. The article of claim 3 wherein the clearance angle of the burnishing facet is in the range from between about 5° to 60°.

5. Apparatus for processing magnetic tape including the article of claim 1 and further comprising means engaging said holding surface for holding said cutting edge in contact with the tape being processed, and means for moving said tape relative to said blade.

6. The apparatus of claim 5 wherein said monocrystalline material is selected from the group consisting of ruby and sapphire.

7. The apparatus of claim 5 wherein the clearance angle of the cutting surface is in the range from between about 5° to 20°.

8. The apparatus of claim 6 wherein the clearance angle of the cutting surface is in the range from between about 5° to 20°.

9. The apparatus of claim 8 wherein the clearance angle of the burnishing facet is in the range from between about 5° to 60°.

UNITED STATES PATENT OFFICE
CERTIFICATE OF CORRECTION

Patent No. 3,587,128 Dated June 28, 1971

Inventor(s) SALVATORE GUALTIERI, RICHARD MARCUCCI, ROMOLO MARCUCCI

It is certified that error appears in the above-identified patent and that said Letters Patent are hereby corrected as shown below:

Col. 4, lines 11, 12, and 16, delete "2-1/4" and insert -- 2-1/2 --

Signed and sealed this 3rd day of December 1974.

(SEAL)
Attest:

McCOY M. GIBSON JR.
Attesting Officer

C. MARSHALL DANN
Commissioner of Patents

FORM PO-1050 (10-69)

USCOMM-DC 60376-P69
☆ U.S. GOVERNMENT PRINTING OFFICE : 1969 O—366-334.